(12) United States Patent
Milne

(10) Patent No.: US 8,149,133 B2
(45) Date of Patent: Apr. 3, 2012

(54) MUX BOP DATABASE MIRRORING

(75) Inventor: Eric Lee Milne, Pearland, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 1566 days.

(21) Appl. No.: 11/551,576

(22) Filed: Oct. 20, 2006

(65) Prior Publication Data

US 2008/0094247 A1    Apr. 24, 2008

(51) Int. Cl.
*G01V 1/46* (2006.01)
(52) U.S. Cl. ...... 340/855.4; 702/6; 175/40; 340/870.07; 340/853.1
(58) Field of Classification Search ............... 340/855.4, 340/853.1, 870.07; 702/6; 175/40
See application file for complete search history.

(56) References Cited

U.S. PATENT DOCUMENTS

| | | | |
|---|---|---|---|
| 5,742,792 A | 4/1998 | Yanai et al. | |
| 5,812,751 A | 9/1998 | Ekrot et al. | |
| 6,067,545 A | 5/2000 | Wolff | |
| 6,199,074 B1 | 3/2001 | Kern et al. | |
| 6,205,449 B1 | 3/2001 | Rastogi et al. | |
| 6,289,357 B1 | 9/2001 | Parker | |
| 6,360,330 B1 | 3/2002 | Mutalik et al. | |
| 6,625,705 B2 | 9/2003 | Yanai et al. | |
| 6,671,705 B1 | 12/2003 | Duprey et al. | |
| 6,687,698 B1 | 2/2004 | Nixon et al. | |
| 6,704,737 B1 | 3/2004 | Nixon et al. | |
| 2002/0016827 A1 | 2/2002 | McCabe et al. | |
| 2004/0153841 A1 | 8/2004 | Beck | |
| 2005/0177766 A1 | 8/2005 | Lee et al. | |
| 2005/0232145 A1* | 10/2005 | Tanju | 370/217 |
| 2006/0037781 A1 | 2/2006 | Leuchtenberg | |
| 2006/0212134 A1* | 9/2006 | Dhawan | 700/3 |
| 2007/0177461 A1* | 8/2007 | Marsh | 367/81 |
| 2007/0275471 A1* | 11/2007 | Coward | 436/55 |

FOREIGN PATENT DOCUMENTS

| | | |
|---|---|---|
| GB | 2403044 A | 12/2004 |
| WO | 9849621 A1 | 11/1998 |
| WO | 03090084 A1 | 10/2003 |
| WO | 2005/080744 A1 | 9/2005 |
| WO | 2005080744 A1 | 9/2005 |
| WO | 03/090084 A1 | 10/2010 |

OTHER PUBLICATIONS

European Search Report and Written Opinion dated Nov. 4, 2009 issued in related International Application No. PCT/US2007/7081764, 7 pages.
English translation of Office Action issued on Sep. 10, 2010 in corresponding Chinese Patent Application No. 200780038993X.

* cited by examiner

*Primary Examiner* — Tuan T Dinh
*Assistant Examiner* — Hung Dang
(74) *Attorney, Agent, or Firm* — Potomac Patent Group PLLC

(57) ABSTRACT

An apparatus to remotely archive data from a blowout preventer includes a first system controller in communication with the blowout preventer and a communications network, and a second system controller in communication with the blowout preventer and the communications network. A first remote server and a second remote server are connected to the communications network. The first remote server is configured to archive the data from the blowout preventer through the first local controller and the communications network. The first remote server is also configured to archive the data from the blowout preventer through the second system controller upon a failure of the first system controller resulting from damage in an oilfield component.

25 Claims, 7 Drawing Sheets

MUX BOP DATABASE MIRRORING

BACKGROUND

Well control is an important aspect of oil and gas exploration. When drilling a well in, for example, oil and gas exploration applications, devices must be put in place to prevent injury to personnel and equipment associated with the drilling activities. One such well control device is known as a blowout preventer (BOP).

Blowout preventers are generally used to seal a wellbore. For example, drilling wells in oil or gas exploration involves penetrating a variety of subsurface geologic structures, or "layers." Each layer generally comprises a specific geologic composition such as, for example, shale, sandstone, limestone, etc. Each layer may contain trapped fluids or gas at different formation pressures, and the formation pressures increase with increasing depth. The pressure in the wellbore is generally adjusted to at least balance the formation pressure by, for example, increasing a density of drilling mud in the wellbore or increasing pump pressure at the surface of the well.

There are occasions during drilling operations when a wellbore may penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore. These "blowouts" often result in catastrophic destruction of the drilling equipment (including, for example, the drilling rig) and in substantial injury or death of rig personnel.

Because of the risk of blowouts, blowout preventers are typically installed at the surface or on the sea floor in deep water drilling arrangements so that kicks may be adequately controlled and "circulated out" of the system. Blowout preventers may be activated to effectively seal in a wellbore until active measures can be taken to control the kick. There are several types of blowout preventers, the most common of which are annular blowout preventers and ram-type blowout preventers.

Annular blowout preventers typically comprise annular elastomer "packers" that may be activated (e.g., inflated) to encapsulate drill pipe and well tools and completely seal the wellbore. A second type of the blowout preventer is the ram-type blowout preventer. Ram-type preventers typically comprise a body and at least two oppositely disposed bonnets. The bonnets are generally secured to the body about their circumference with, for example, bolts. Alternatively, bonnets may be secured to the body with a hinge and bolts so that the bonnet may be rotated to the side for maintenance access.

Interior of each bonnet contains a piston actuated ram. The functionality of the rams may include pipe rams, shear rams, or blind rams. Pipe rams (including variable bore rams) engage and seal around the drill pipe or well tool left in the wellbore, leaving the engaged objects intact. In contrast, shear rams engage and physically shear the drill pipe or well tools left in the wellbore. Similarly, blind rams engage each other and seal off the wellbore when no drill pipe or well tools are in the wellbore. The rams are typically located opposite of each other and, whether pipe rams, shear rams, or blind rams, the rams typically seal against one another proximate a center of the wellbore in order to seal the wellbore.

As such, many oil and gas bearing formations lie beneath large bodies of water. Producing wells extending into these formations are equipped with subsea wellheads and other underwater installations which rest at the ocean or sea floor. As such, it is customary to provide blowout protection and other related functions during subsea drilling operations. As such subsea blowout preventer installations may be equipped with numerous and varied types of valves, rams, and other operating controls that may be hydraulically, electro-mechanically, or electro-hydraulically operated to control wellbore fluids.

In shallow water, many subsea blowout preventer and flow control installations are controlled hydraulically. These all-hydraulic systems may include a bundle of hydraulic hoses and control lines extending between the surface and subsea facilities. Alternatively, individual hoses may supply hydraulic power from the surface to the subsea installation to monitor the status of the subsea equipment and perform control operations. Advantageously, these systems are simple, reliable, and inexpensive for relatively short hose lengths (i.e., water depths) although response time may be slow. However, in deep-water installations, the response time for a hydraulic system increases and its reliability decreases.

In response to the demands of deep-water subsea environments, electro-hydraulic systems were introduced to improve the performance of traditional hydraulic systems in deep water or over long distances. As such, an electro-hydraulic subsea control cable may employ a multiplex (MUX) hose in which several hydraulic control signals may be multiplexed (e.g., through digital time division) and transmitted. The multitude of signals may then be separated out at the end of the multiplex hose and used to manipulate valves in a control pod of a blowout preventer or another subsea component. While a multiplex umbilical line may be a hydraulic hose, it should be understood that an electrical line may also serve as a multiplexing conduit.

Referring initially to FIG. 1, an example of an offshore drilling unit 10 taken from U.S. Pat. No. 6,484,806, issued to Childers et al., and incorporated by reference in its entirety is shown. Drilling unit 10 includes a floating drilling rig 12 in water 14 capable of drilling a well into a sea floor 16. Drilling unit 10 is shown connected to a BOP stack 30 having a plurality of ram BOP actuators 94 through a pair of umbilical cables 22 and 24. As such, electro-hydraulic systems controlling blowout preventers through hoses require a control system.

As such, it may be desirable to archive control system data in a database for future use or analysis. Particularly, it is desirable for any process control system to have data storage device, such as a database, in a remote location. Such systems may need to update and/or store information remotely for either archival purposes or for retrieval from another remote system. For example, a remote (e.g., international) manufacturing plant may need to store pertinent production data remotely for archival purposes. In contrast, a local (e.g., domestic) system may access the same remote archive for local display and processing of the production data.

A database may be a collection of data organized usefully for the benefit of a software application (e.g., a control system). Typically, a database is associated with a software-based database manager that performs a variety of tasks (e.g., software application tasks) on the database, the range of which vary largely upon the intended use of the database and the sophistication of the database manager.

As subsea well drilling is performed in what would be considered to be a harsh environment, numerous threats exist that endanger subsea equipment. Therefore, it is desirable for subsea equipment and systems to be resilient and functional despite these threats. One way to achieve this resilience is to add redundancy to systems currently in place. Therefore, it is desirable for a control system to have redundant features, as BOP control systems protect equipment, the environment, and the lives of rig operators.

SUMMARY

In one aspect of one or more embodiments, an apparatus to remotely archive data from a blowout preventer comprises a first system controller in communication with the blowout preventer and a communications network, a second system controller in communication with the blowout preventer and the communications network, a first remote server connected to the communications network, and a second remote server connected to the communications network. The first remote server is configured to archive the data from the blowout preventer through the first local controller and the communications network. The first remote server is configured to archive the data from the blowout preventer through the second system controller upon a failure of the first system controller resulting from damage in an oilfield component.

In one aspect of one or more embodiments, an apparatus to remotely archive data from a blowout preventer comprises a system controller in communication with the blowout preventer and a communications network, a first remote server in communication with the communications network, a second remote server in communication with the communications network. The first remote server is configured to archive the data from the blowout preventer through the system controller and the communications network. The second remote server is configured to archive the data from the blowout preventer through the system controller and the communications network upon a failure of the first remote server resulting from damage in an oilfield component.

In one aspect of one or more embodiments, an apparatus to remotely archive data from a blowout preventer comprises a first system controller in communication with the blowout preventer, a communications network, and a redundant network, a second system controller in communication with the blowout preventer, the communications network, and the redundant network, a first remote server in communication with the communications network and the redundant network, and a second remote server in communication with the communications network and the redundant network. At least one of the first remote server and the second remote server is configured to archive the data from the blowout preventer through the communications network and at least one of the first system controller and the second system controller. Further, the at least one of the first remote server and the second remote server is configured to archive the data from the blowout preventer through the redundant network upon a failure of the communications network resulting from damage in an oilfield component.

In one aspect of one or more embodiments, an apparatus to remotely archive data from a blowout preventer comprises a first system controller in communication with the blowout preventer and a communications network, a second system controller in communication with the blowout preventer and the communications network, and a remote server in communication with the communications network. The remote server is configured to archive the data from the blowout preventer through the first system controller and the communications network. The remote server is configured to archive the data from the blowout preventer through the second system controller and the communications network upon a failure of the first system controller resulting from damage in an oilfield component.

In one aspect of one or more embodiments, a method to remotely archive data from a blowout preventer comprises communicating a first system controller with the blowout preventer and a communications network, communicating a second system controller with the blowout preventer and the communications network, connecting a first remote server and a second remote server to the communications network, archiving the data from the blowout preventer to one of the first remote server and the second remote server through the communications network and one of the first system controller and the second system controller, and archiving the data from the blowout preventer through the second system controller upon a failure of the first system controller resulting from damage of an oilfield component.

In one aspect of one or more embodiments, a method to remotely archive blowout preventer data comprises connecting a first system controller, a second system controller, a first remote server, and a second remote server to a communications network, receiving the blowout preventer data in the first and second system controllers, archiving the blowout preventer data from the first system controller to the first remote server, and archiving the blowout preventer data from the first system controller to the second remote server upon a failure of the first remote server resulting from damage to an oilfield component.

DETAILED DESCRIPTION

Figure 1:
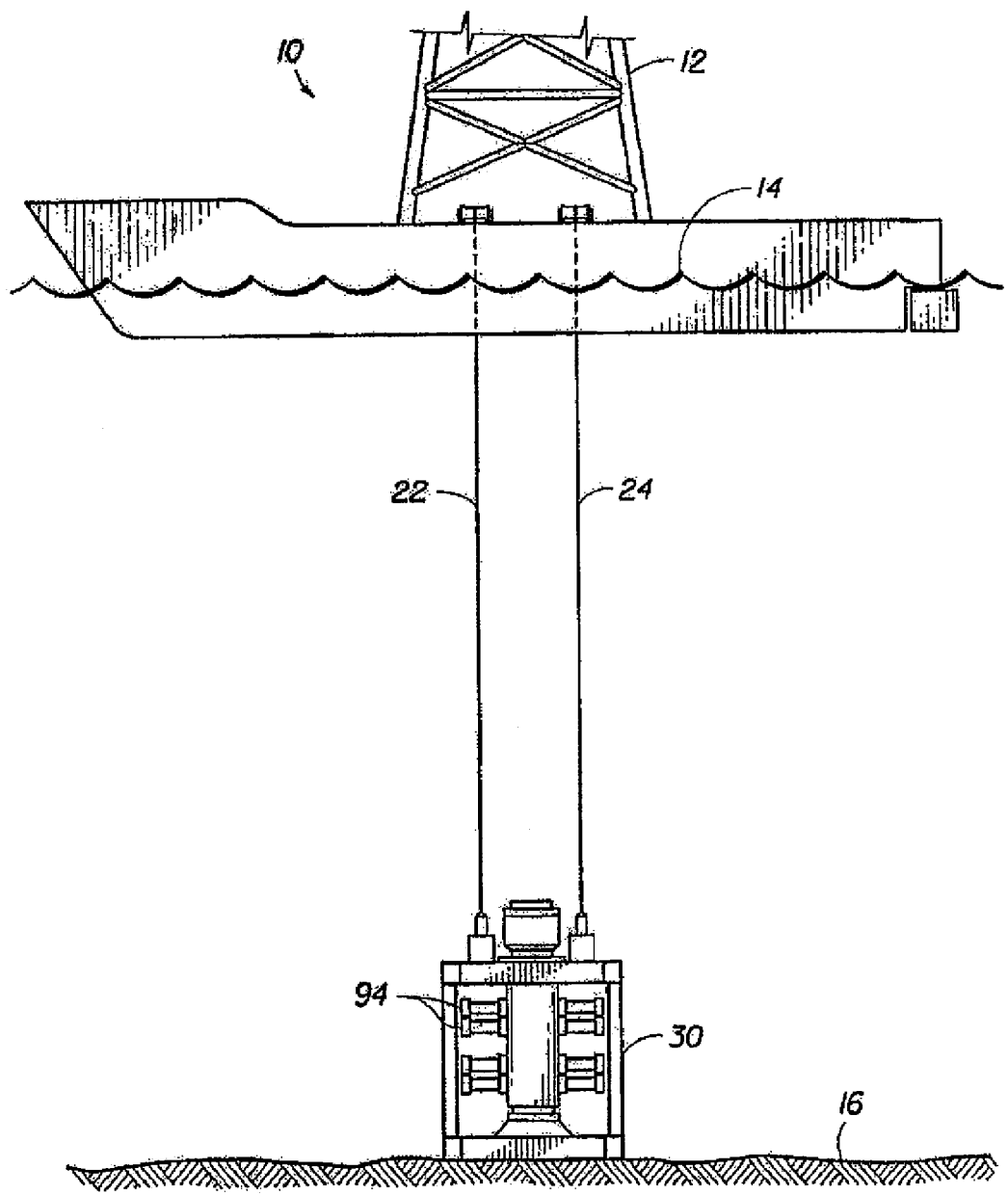
FIG. 1 shows a prior art oil drilling unit.

Specific embodiments of the present disclosure will now be described in detail with reference to the accompanying Figures. Like elements in the various Figures are denoted by like reference numerals for consistency.

In the following detailed description of one or more embodiments, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the present disclosure relate to a method and a system to provide remote database mirroring with provisions for local data backup. More specifically, embodiments of the present disclosure provide remote platforms to host master and backup databases, in which the contents of the databases will be mirrored across the remote platforms. Further, the method and the system provide writes to the local disk upon failure of the remote platforms. The local writes may be automatically updated to the master database upon restoration.

Figure 2:
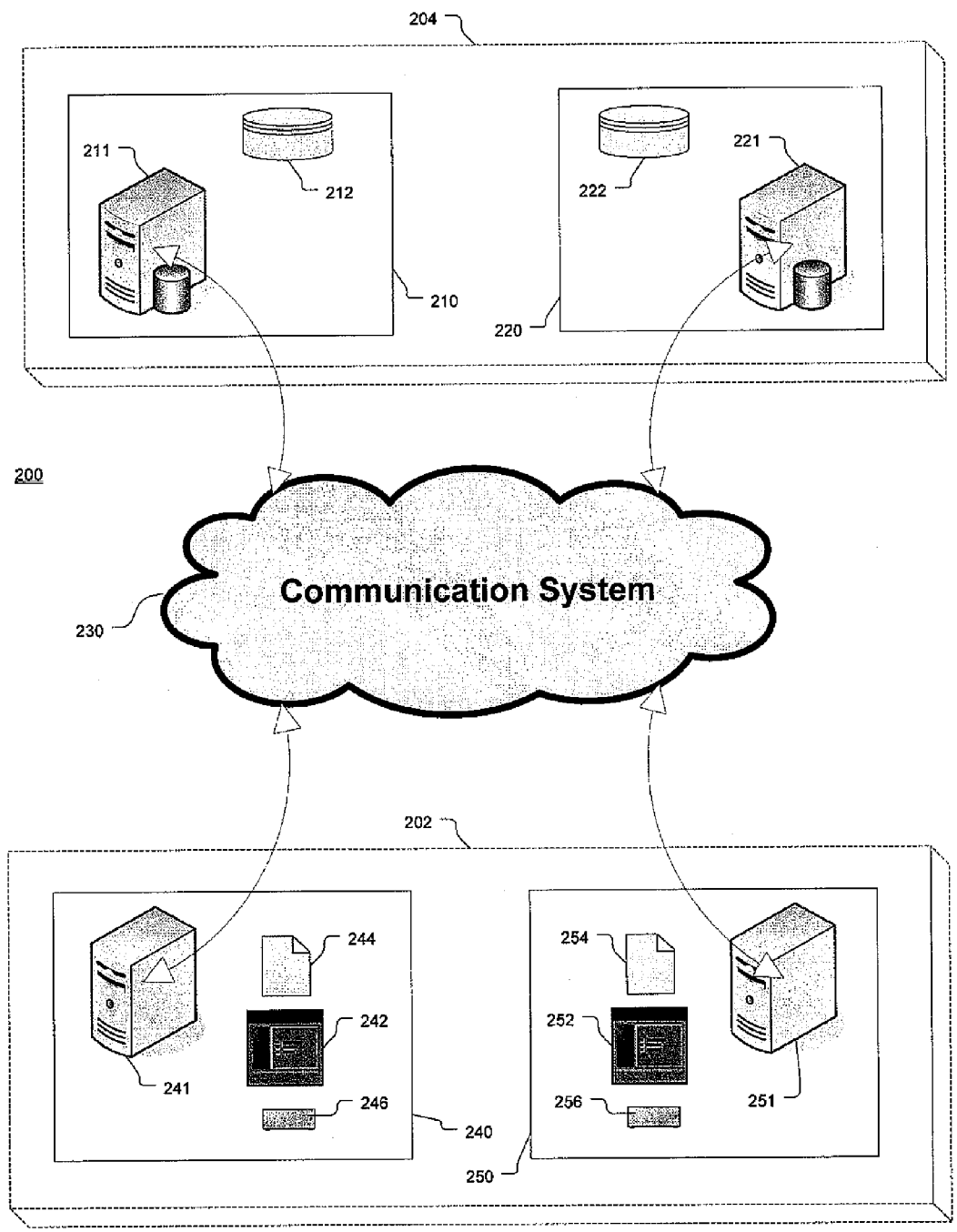
FIG. 2 shows a database system in accordance with an embodiment of the present disclosure.

FIG. 2 shows a system 200 for remotely archiving data from a local location 202 that includes a first system controller 240 including a first local processor 241, a first local storage device 246, a first archiving application 242, and a first set of blowout preventer data 244 that is to be archived to a remote database 204. It should be understood that local storage device 246 may be any device known to one of ordinary skill in the art including, but not limited to, magnetic drives, flash memory, volatile memory, and optical drives. Furthermore, first system controller 240 may be part of a process control system that updates or stores data remotely, or first system controller 240 may receive first set of blowout preventer data 244 for archival from another source, such as from a device connected through a communication system 230, or first set of BOP data 244 may originate on first system controller 240 in some other fashion.

In operation, first archiving application 242 directs first system controller 240 in an attempt to archive first set of BOP data 244. First archiving application 240 initially operates in a primary mode, which instructs first system controller 240 to carry out the process of archiving data. In one embodiment, when first system controller 240 has first set of BOP data 244 that needs to be archived, first archiving application 242 operating in primary mode directs first system controller 240 in sending first set of BOP data 244 to remote database 204 for archival. Furthermore, in a case where remote database 204 is unavailable, first archiving application 242 operating in primary mode may direct first system controller 240 to write first set of BOP data 244 to first local storage device 246.

Furthermore, system 200 includes a second system controller 250 configured to provide redundancy in the event of a failure of first system controller 240. In one embodiment, first system controller 240 is configured to communicate with second system controller 250 through communication system 230, such as a local area network ("LAN") or a wide area network ("WAN"). As such, second system controller 250 includes a second local processor 251, a second local storage device 256, a second archiving application 252, and a second set of blowout preventer data 254. Preferably, second set of BOP data 254 is identical to first set of BOP data 244 on first system controller 240 and may be obtained by second system controller 250 in a manner similar to that of first system controller 240.

It should be understood by one of ordinary skill that BOP data (e.g., sets 244, 254) may include any measurable or recordable information (e.g. wellbore pressure, wellbore temperature, ram position etc. related to the operation and control of a remotely located (e.g., subsea) blowout preventer. The ability to archive and retrieve BOP data may be especially useful in monitoring and controlling the wellbore as it is drilled. As mentioned above, a blowout preventer is an important safety tool useful in controlling adverse wellbore pressure events and preventing damage to operators, equipment, and the environment. As such, archived historical BOP data may be useful in predicting wellbore behavior for the same or a similar well in the future.

Particularly, current operating conditions may be compared with historical data in an attempt to predict wellbore pressure events (e.g., blowouts and kicks) earlier than would be possible without the historical data. For example, a well about to experience a kick may output BOP data resembling data preceding a kick stored in the historical database. As such, analysis of historical data may be able to indicate that a kick is likely to happen earlier than would be predictable with only real-time BOP data. Such foresight may be even more valuable in circumstances where blowout preventers are remotely controlled, and a communication delay may exist between the BOP and the operator. In such a case, detecting a wellbore kick mere seconds earlier than would be detected otherwise may make the difference between controlling the kick or not.

Second archiving application 252 executing on second system controller 250 may be identical to first archiving application 242 executing on first system controller 240. However, as only one of archiving applications 242, 252 may operate in primary mode, the other will operate in a secondary mode. Second archiving application 252 initially operates in secondary mode, which does not require second system controller 250 to archive data.

System 200 is shown including two system controllers 240, 250 to provide a level of redundancy in case one system controller fails. For example, if first archiving application 242 executing on first system controller 240 is operating in primary mode and either first archiving application 242 or first system controller 240 fails, second archiving application 252 on second system controller 250 may switch to operate in primary mode. This allows second system controller 250 to carry out the process of archiving data, just as first system controller 240 did prior to the failure. In addition, when the functionality of first system controller 240 or first archiving application 242 is restored, first archiving application 242 may either switch back to primary mode or operate in secondary mode.

Similarly, in a case where second archiving application 252 is operating in primary mode and either second archiving application 252 or second system controller 250 fails, then first archiving application 242 may switch to operate in primary mode. In short, either first system controller 240 or second system controller 250 may act as a redundant system controller for the other.

While first system controller 240 and second system controller 250 may perform the same task, they may nonetheless include different types of processors. For example, system controllers 240, 250 may have different types of hardware and/or software platforms for durability. Particularly, certain events and/or conditions may cause failure in one type of hardware/software platform, but not others. For example, one system controller may include a WINDOWS platform while the other includes a LINUX platform. Additionally, system 200 may include more than 2 system controllers to provide an additional level of redundancy.

In one embodiment, an archiving application operating in secondary mode may direct its respective system controller to continuously back up raw data for a specified time interval to the local storage device. For example, if second archiving application 252 is operating in secondary mode, second system controller 250 may be directed to keep the past 5 minutes of data to be archived on second local storage device 256. Thus, if second archiving application 252 were to switch to operate in primary mode there would be no data lost during the transition.

Next, first system controller 240 and second system controller 250 are both shown configured to communicate with remote database 204 via communication system 230. Optionally, remote database 204 may include a database operating in a master mode and a database operating in a backup mode, wherein each would be located on either a first remote server 210 or a second remote server 220. Remote servers 210, 220 may be located in separate geographical locations from system controllers 240, 250, each other, or both.

As such, system 200 includes first remote server 210 configured to communicate with first and second system controllers 240, 250 via communication system 230. First remote server 210 includes a first remote processor 211 and a first database 212 that constitutes a part of remote database 204. First database 212 initially operates in master mode, and is therefore acting as the master database. System 200 also includes second remote server 220, configured to communicate with first and second system controllers 240, 250 via communication system 230. Second remote server 220 includes a second remote processor 221 and a second database 222 that constitutes a part of remote database 204. Second database 222 initially operates in backup mode, and is therefore acting as the backup database.

A database operating in master mode ensures that any data received that is to be archived is archived in the database. Furthermore, system 200 is configured such that the backup database mirrors, or copies the data of, the master database. Second remote server 220 is configured to communicate with first remote server 210 via communication system 230 so the backup database may mirror the master database. Because of this mirroring function, first database 212 on first remote server 210 and second database 222 on second remote server 220 preferably contain identical sets of data. This ensures that remote database 204 has a level of redundancy in case one of databases 212, 222 or remote servers 210, 220 fails.

Therefore, in a case where first database 212 or second database 222 fails, the system as a whole will not fail, due to the redundancy present in remote database 204. For example, in a case where either first database 212 functioning in master mode or first remote server 210 fails, second database 222 on second remote server 220 may switch to operate in master mode, thereby performing the functions of failed database 212. As first database 212 and second database 222 have identical sets of data provided by the mirroring, no data will be lost in the case of a failure and the switch will be seamless. Furthermore, when first database 212 is restored it may switch to operate in backup mode so that it may mirror second database 222 operating in master mode.

Similarly, in a case where second database 222 operating in master mode or second processor 220 fails, then first database 212 may switch to operate in master mode. In short, either first database 212 or second database 222 may act as a redundant mirrored database for the other. Further, as with system controllers 240, 250, remote servers 210, 220 may include differing hardware/software platforms to accomplish their tasks. Furthermore, system 200 may include more than 2 remote servers to provide even greater levels of redundancy.

In one embodiment, first remote server 210 and second remote server 220 may be storage providers such as a server, a processing device having an internal storage device, a processing device connected to an external storage device, or any equivalents thereof.

In one embodiment, first archiving application 242 functioning in primary mode sends first set of BOP data 244 to the master database. In such an embodiment, first archiving application 242 operating in primary mode may detect on which of remote servers 210, 220 the database 212, 222 operating in master mode resides. First archiving application 242 operating in primary mode then sends first set of BOP data 244 to first remote server 210 or second remote server 220 on which the database operating in master mode resides. In another embodiment, first archiving application 242 attempts to send first set of BOP data 244 to first remote server 210 before attempting a send to second remote server 220.

In a case where first archiving application 242 operating in primary mode cannot send first set of BOP data 244 to remote database 204 due to a failure of both databases 212, 222, remote servers 210, 220, or communications system 230, first archiving application 242 may write first set of BOP data 244 to first local storage device 246. Thus, no data is lost even in a case where both databases 212, 222 have completely failed or are otherwise unavailable. Data that is written to first local storage device 246 in this situation may later be updated to remote database 204 upon restoration. For example, in a case where data is written to first local storage device 246 due to an inability to write to remote database 204, after restoration, first archiving application 242 operating in primary mode may send the written data to the restored master database. Similarly, the same process also relates to second archiving application 252 and its related components when the second archiving application 252 is operating in primary mode.

Communication system 230 facilitates communication between components in system 200. The communication between components in system 200 may be in the form of sending and receiving data between the components, wherein the data is a set of data to be archived or other data necessary for the functionality of system 200. Further, communication system 230 may include any type of communication means, such as a LAN, WAN, Ethernet bus, satellite, cellular, any other type of wired or wireless link, and equivalents thereof.

Furthermore, communication system 230 may comprise a plurality of networks or communication mechanisms. Particularly, two components configured to communicate with each other may communicate through more than one communication mechanism. For example, first system controller 240 and second system controller 250 may be connected to each other through more than one local area network. The plurality of networks may serve as an additional level of redundancy in system 200.

Such redundancy in system 200 allows BOP data and control information to be archived even in the event of damage to one or more oilfield components. As used herein, "oilfield components" may include components of system 200 (or system 300 of FIG. 3) or any other component that may affect the viability of the drilling operation. For example, blowout preventers, mooring lines, umbilical cables, subsea wellheads, hydraulic lines, subsea risers, valves, and communication lines may be considered oilfield components. Nonetheless, in certain remote monitoring schemes (e.g., subsea wellhead installations), BOP data must travel great distances through hazardous conditions to get from a blowout preventer to an archiving server (e.g., 210 and 220). For example, in a subsea drilling environment, surface weather (e.g., tropical storms, etc.), subsea environmental conditions (e.g., currents, seismic events, etc.), construction and maintenance operations (e.g., remotely operated vehicle collisions, careless divers, etc.), and undersea plant and animal life (e.g., barnacles, coral growth, whales, etc.) may result in a loss of one or more oilfield components.

Having redundancy (i.e., multiple remote servers 210, 220, system controllers 240, 250, and networks 230) in system 200 allows it to continue to function and archive BOP data in the event one or more oilfield components fail. For example, multiple networks linking subsea and surface oilfield components may be encased in separate umbilical lines extending therebetween such that if one umbilical is physically damaged, the other is capable of carrying out the archiving and control tasks. Similarly, backup system controllers (e.g., 240) may continue to record and transmit BOP data in the event a primary controller (e.g., 250) becomes inoperable.

Figure 3:
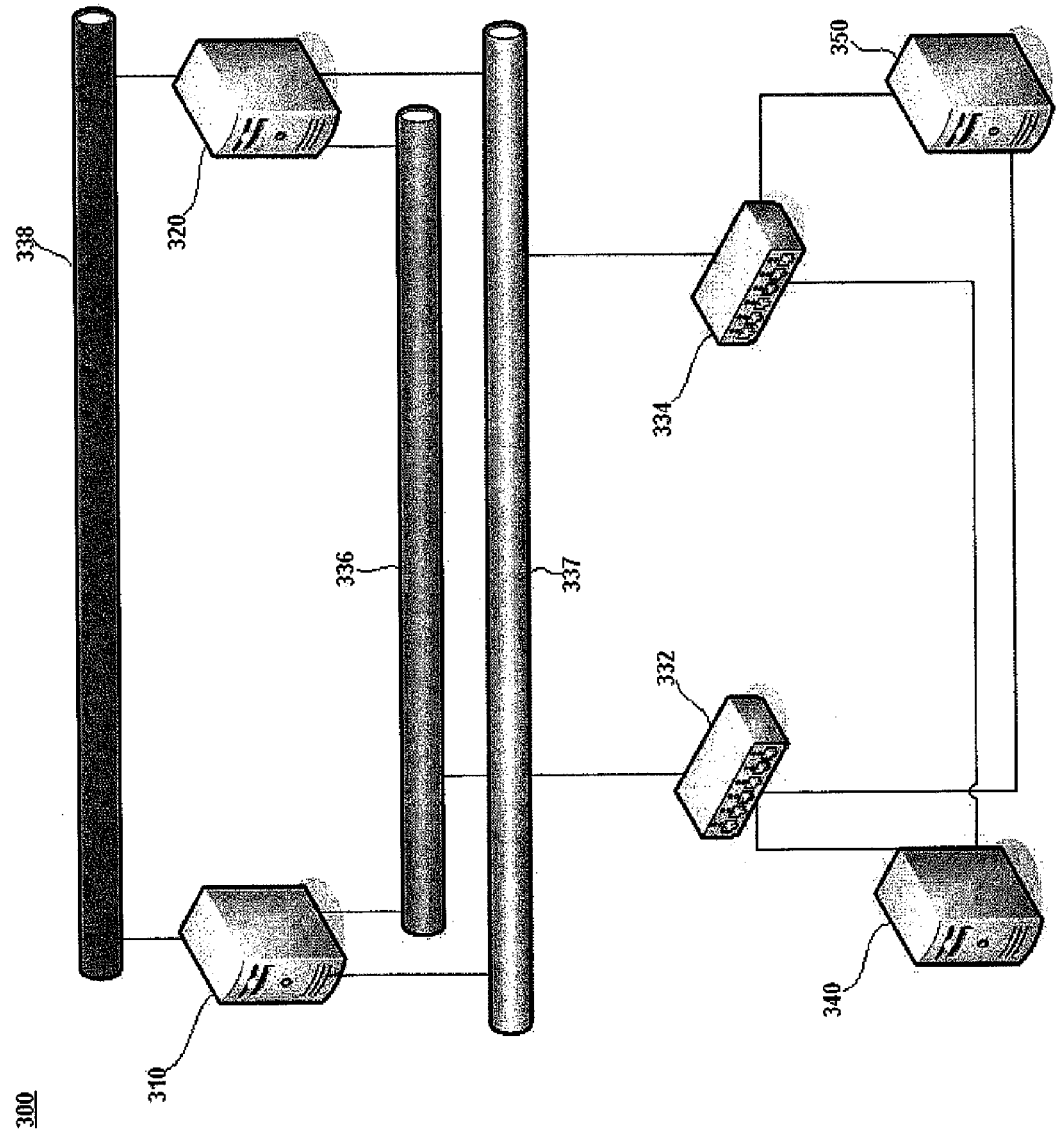
FIG. 3 shows an example system in accordance with an embodiment of the present disclosure.

Referring now to FIG. 3, a system 300 for archiving data in a control system such as MUX BOP control system is shown. System 300 includes a first system controller 340 having (in a manner similar to 240 of FIG. 2) a first local processor, a first local storage device, a first archiving application, and a first set of BOP data that is to be archived. First archiving application is initially set to operate in primary mode and first system controller 340 is connected to a first network switch 332.

Additionally, a second system controller 350 configured to communicate with first system controller 340 is connected to first network switch 332. Second system controller 350 may also include a second local processor, a second local storage device, a second archiving application, and a second set of BOP data. Second set of BOP data may be identical to first set of data and second system controller 350 provides a redundant system controller for system 300 in a manner similar to second system controller 250 of system 200 (FIG. 2). First system controller 340 and second system controller 350 function similar to first system controller 240 and second system controller 250 of system 200 described above.

As shown, first network switch 332 is connected to a first MUX network 336, which is part of a MUX BOP control system. Generally, a MUX network may be defined as a network in which multiple signals are combined and transported over a single transmission channel. Additionally, a first remote server 310 and a second remote server 320 are connected to first MUX network 336. Therefore, first system controller 340 and the second system controller 350 communicate with first remote server 310 and second remote server 320 through first network switch 332 and first MUX network 336.

First remote server 310 has a first remote processor and a first database initially operating in master mode. Second remote server 320 has a second remote processor and a second database initially operating in backup mode and provides a redundant remote server for system 300 similar to second remote server 220 provided in system 200 of FIG. 2. First remote server 310 and second remote server 320 function similarly to first remote server 210 and second remote server 220 of system 200 described above. Moreover, the first database on first remote server 310 functions similarly to first database 212 on first remote server 210, and the second database on second remote server 320 functions similarly to second database 222 on second remote server 220. First and second remote servers 310, 320 may be further connected to a data archive synchronization network 338 that facilitates communication between the two servers, enabling mirroring of the databases on first remote server 310 and second remote server 320.

Additionally, first system controller 340 and second system controller 350 are each connected to a second network switch 334, which, in turn, is connected to a second MUX network 337. First remote server 310 and second remote server 320 may also be connected to second MUX network 337. Connecting the components of system 300 together via second network switch 334 and second MUX network 337 provides an additional level of redundancy for system 300. Second network switch 334 and second MUX network 337 are capable of ensuring the system remains functional even in the event first network switch 332 or first MUX network 336 fails. Furthermore, it is possible to add additional network components to system 300 in order to provide greater redundancy.

Figure 4:
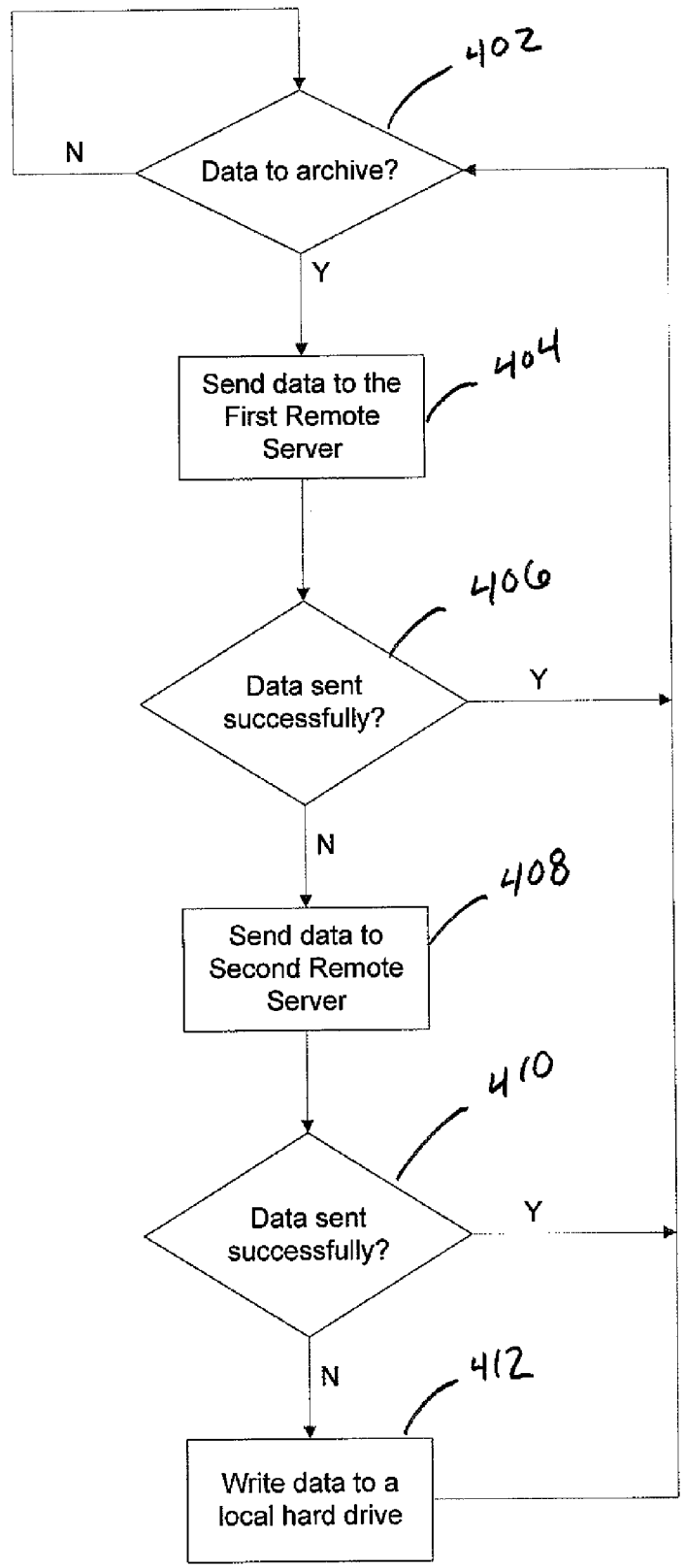
FIG. 4 shows a flowchart for a process in accordance with an embodiment of the present disclosure.

Referring now to FIG. 4, a flowchart showing the steps executed under the direction of an archiving application operating in primary mode is shown. The steps may be executed by a system controller on which the archiving application operating in primary mode resides, such as first system controller 240 or second system controller 250 of FIG. 2. First, step 402 determines if there is any BOP data to archive. If there is no BOP data to archive, step 402 is repeated until there is BOP data to archive. When there is data to archives step 404 sends the BOP data to a first remote server (e.g., 210 of FIG. 2). Next, step 406 determines whether the data was sent successfully. A successful send is achieved if all of the BOP data is received on the first remote server such that the data may be archived in the database. If the data was sent successfully, step 402 is executed again. If the data was not sent successfully, step 408 sends the BOP data to a second remote server (e.g., 220 of FIG. 2). Next, step 410 determines whether the BOP data was sent to the second remote server successfully. If the BOP data was sent successfully; step 402 is executed again. If the data was not sent successfully, then the system controller is unable to communicate with remote database 204, and step 412 writes the BOP data to a local storage device.

Figure 5:
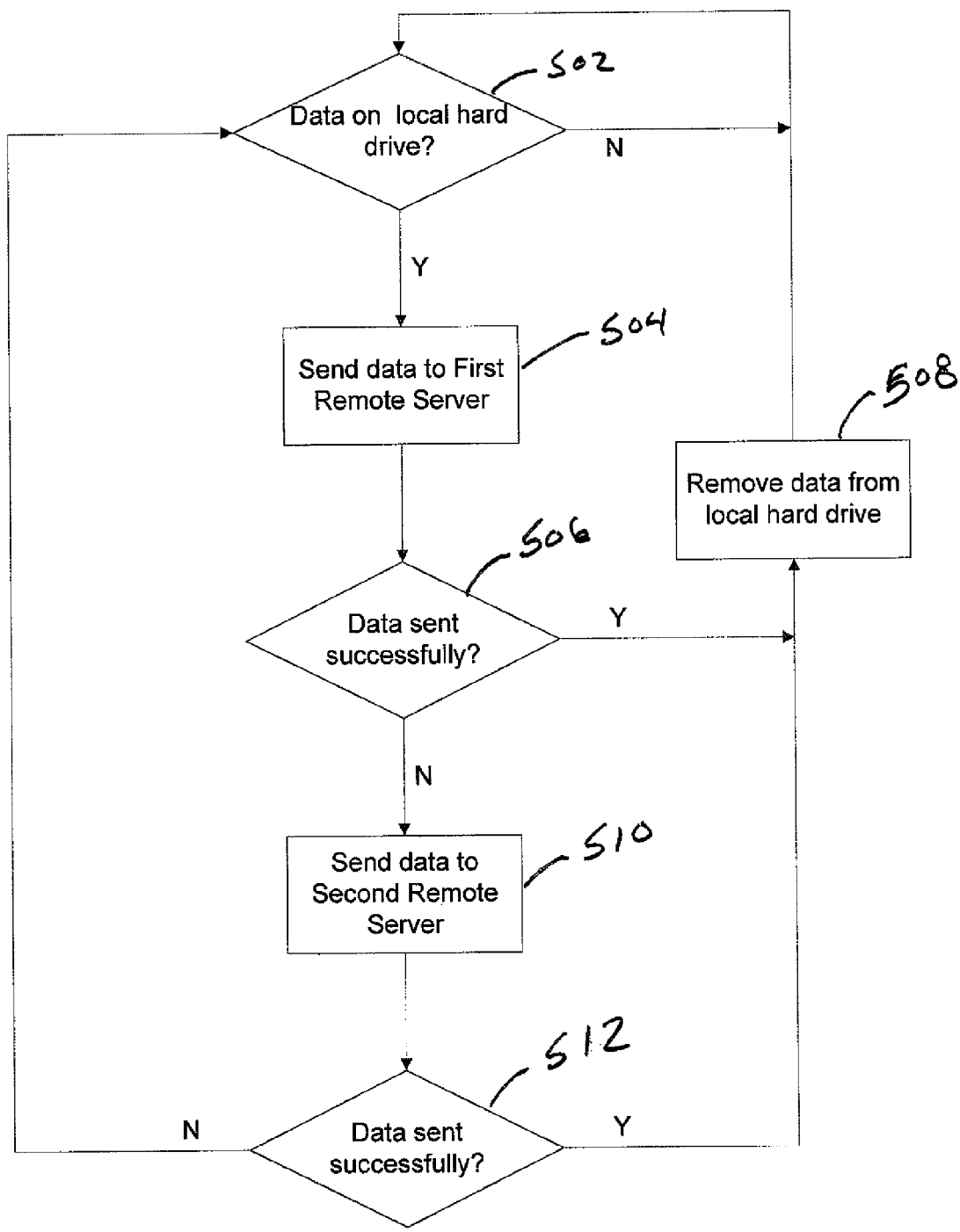
FIG. 5 shows a flowchart for a process in accordance with an embodiment of the present disclosure.

Referring now to FIG. 5, a flowchart showing the steps executed in order to archive BOP data written to a local storage device is shown. The steps in FIG. 5 are preferably executed by a system controller, such as first system controller 240 or second system controller 250 of FIG. 2. First, step 502 determines whether there is BOP data on the local storage device of the system controller. If there is no BOP data on the local storage device, step 502 is repeated until there is data on the local storage device. When there is BOP data on the local storage device, step 504 sends the data to a first remote server (e.g., 210 of FIG. 2). Next, step 506 determines whether the data was sent successfully. A successful send is achieved if all of the BOP data is received on the first remote server so that the data may be archived in the database. If the data was sent successfully, step 508 removes the data from the local storage device, and step 502 is executed again. If the data was not sent successfully, step 510 sends the BOP data to a second remote server (e.g., 220 of FIG. 2). Step 512 determines if the data was sent to the second remote server successfully. If the data was not sent successfully, step 502 is executed, repeating the process of archiving BOP data written to a local storage device. If the data was sent successfully, step 508 may remove the BOP data from the local storage device, and then step 502 is executed.

Figure 6:
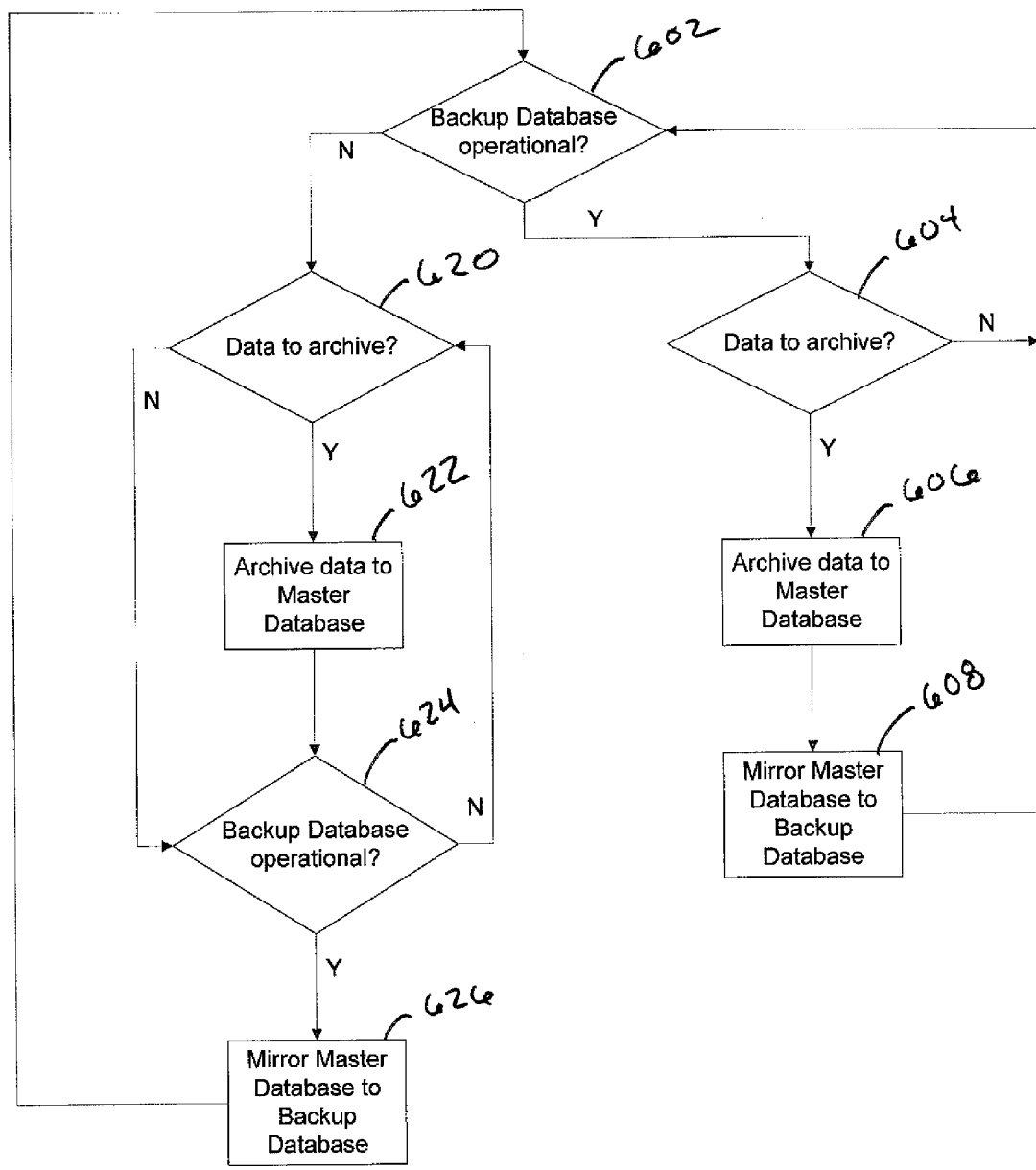
FIG. 6 shows a flowchart for a process in accordance with an embodiment of the present disclosure.

Referring now to FIG. 6, a flowchart showing the steps executed under the direction of a database operating in the master mode is shown. The steps may be executed by the remote server on which the database operating in master mode resides, such as first remote server 210 or second remote server 220 of FIG. 2. Step 602 determines whether a database operating in backup mode is operational. This step is provided such that in a case where a database operating in backup mode is not operational, the database will be updated to mirror the database operating in master mode as soon as it is restored. If the database is operational, step 604 determines if there is BOP data to archives If there is no data to archive, steps 602 and 604 are looped until there is data to archive. If there is BOP data to archive, step 606 archives the BOP data to the master database. Next, step 608 mirrors the database operating in master mode onto the database operating in backup mode.

If step 602 determines that the database operating in backup mode is not operational, step 620 determines whether there is any BOP data to archive. If there is data to archive, step 622 archives the BOP data to the master database. Next, step 624 determines if the database operating in backup mode is operational yet. If the database is not yet operational step 620 is executed again such that any further BOP data may be archived. If step 624 determines that the database is operational, then step 626 mirrors the database operating in master mode onto the database operating in backup mode, and step 602 is executed again. Thus, the database operating in master mode is not unduly delayed in archiving BOP data, and the database operating in backup mode is updated to mirror the database operating in master mode as soon as it is restored.

Figure 7:
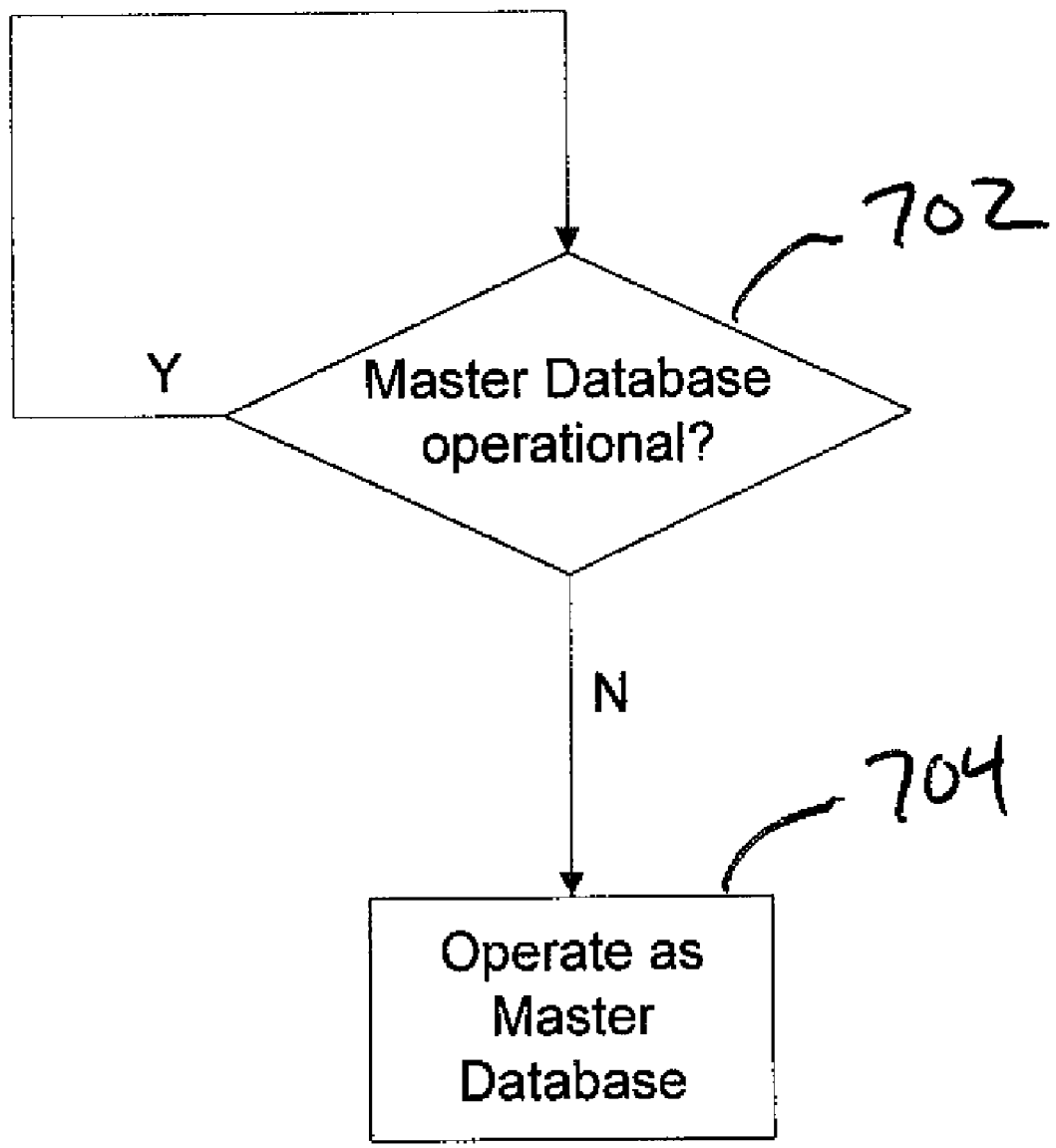
FIG. 7 shows a flowchart for a process in accordance with an embodiment of the present disclosure.

Referring now to FIG. 7, a flowchart showing the steps executed under the direction of a database operating in backup mode is shown, The steps may be executed by the remote server on which the database operating in backup mode resides, such as first remote server 210 or second remote server 220 of FIG. 2. The steps serve to enable the database operating in backup mode to switch to operate in master mode in a case where the master database fails. Step 702 determines whether the database operating in master mode is operational. If the database is operational, step 702 repeats until the database is not operational. If the database operating in master mode is not operational, step 704 switches the backup database to operate in master mode.

The invention described herein may be used with a variety of different systems, For example, the system may be used with any process control system that needs to update and/or store information remotely for either archival purposes and/or for retrieval from another remote system. For example, a remote (e.g., international) manufacturing plant may need to store pertinent production data remotely for archival purposes. A local (e.g., domestic) system could access the same remote archive for local display and processing of the production data. Furthermore, the system may be used with any system where information needs to be stored reliably in a remote location with multiple redundancies in place to handle the various failure scenarios to ensure no loss of data.

Systems 200 and 300 exhibit many advantages over other systems that may be used for a similar purpose. The databases, system controllers, remote servers, and communication networks may be considered common points of failure. Systems 200 and 300 provide redundancy in these elements so that if something does fail, the system may continue to be operational. Additionally, local data writes may be employed to prevent data loss even when the entire remote database has failed, i.e., the master and backup databases are unavailable. Furthermore, the database mirroring ensures that the plurality of databases do not become out of sync. These advantages are especially important in MUX BOP control systems, as it is crucial that the systems in use remain operational despite the inevitable failures caused by harsh conditions.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. An apparatus to remotely archive data from a blowout preventer, the apparatus comprising:
a first system controller in communication with the blowout preventer and a communications network;
a second system controller in communication with the blowout preventer and the communications network;
a first remote server connected to the communications network; and
a second remote server connected to the communications network;
wherein the first remote server is configured to archive the data from the blowout preventer through the first system controller and the communications network;
wherein the first remote server is configured to archive the data from the blowout preventer through the second system controller upon a failure of the first system controller resulting from damage in an oilfield component.

2. The apparatus of claim 1, wherein the second remote server is configured to archive the data from the blowout preventer through the second system controller upon a failure of the first system controller from damage in the oilfield component.

3. The apparatus of claim 1, wherein the second remote server is configured to archive the data from the blowout preventer through the second system controller upon a failure of the first system controller and the first remote server from damage in the oilfield component.

4. The apparatus of claim 1, wherein the first system controller is configured to archive the data from the blowout preventer to a local storage device upon a failure of the communications network from damage in the oilfield component.

5. The apparatus of claim 1, wherein the second system controller is configured to archive the data from the blowout preventer to a local storage device upon a failure of the first system controller and the communications network from damage in the oilfield component.

6. The apparatus of claim 1, wherein the second system controller is configured to backup the data from the blowout preventer for a specified time interval to a local storage device.

7. The apparatus of claim 1, wherein a portion of a storage device of the second system controller is configured to mirror a portion of a storage device of the first system controller.

8. The apparatus of claim 1, wherein a database of the second remote controller is configured to mirror a database of the first remote server.

9. The apparatus of claim 1, wherein the communications network comprises a MUX network.

10. The apparatus of claim 1, further comprising a redundant network.

11. The apparatus of claim 10, wherein the first remote server is configured to archive the data from the blowout preventer through the first system controller and the redundant network upon a failure of the communications network from damage in the oilfield component.

12. The apparatus of claim 10, wherein the first remote server is configured to archive the data from the blowout preventer through the second system controller and the redundant network upon a failure of the first system controller and the communications network from damage in the oilfield component.

13. An apparatus to remotely archive data from a blowout preventer, the apparatus comprising:
a system controller in communication with the blowout preventer and a communications network;
a first remote server in communication with the communications network;
a second remote server in communication with the communications network;
wherein the first remote server is configured to archive the data from the blowout preventer through the system controller and the communications network;
wherein the second remote server is configured to archive the data from the blowout preventer through the system controller and the communications network upon a failure of the first remote server resulting from damage in an oilfield component.

14. An apparatus to remotely archive data from a blowout preventer, the apparatus comprising:

a first system controller in communication with the blowout preventer, a communications network, and a redundant network;

a second system controller in communication with the blowout preventer, the communications network, and the redundant network;

a first remote server in communication with the communications network and the redundant network; and a second remote server in communication with the communications network and the redundant network;

wherein at least one of the first remote server and the second remote server is configured to archive the data from the blowout preventer through the communications network and at least one of the first system controller and the second system controller;

wherein the at least one of the first remote server and the second remote server is configured to archive the data from the blowout preventer through the redundant network upon a failure of the communications network resulting from damage in an oilfield component.

15. A method to remotely archive data from a blowout preventer, the method comprising:

communicating a first system controller with the blowout preventer and a communications network;

communicating a second system controller with the blowout preventer and the communications network;

connecting a first remote server and a second remote server to the communications network;

archiving the data from the blowout preventer to one of the first remote server and the second remote server through the communications network and one of the first system controller and the second system controller; and archiving the data from the blowout preventer through the second system controller upon a failure of the first system controller resulting from damage of an oilfield component.

16. The method of claim 15, further comprising connecting the first system controller, the second system controller, the first remote server, and the second remote server to a redundant network.

17. The method of claim 16, further comprising archiving the data from the blowout preventer through the redundant network upon a failure of the communications network from damage of the oilfield component.

18. The method of claim 15, further comprising archiving the data from the blowout preventer to the second remote server upon a failure of the first remote server from damage of the oilfield component.

19. The method of claim 18, further comprising mirroring a database of the first remote server with a database of the second remote server upon restoration of the first remote server.

20. The method of claim 15, further comprising backing up the data from the blowout preventer to a local storage device of the other of the first system controller and the second system controller for a specified time interval.

21. A method to remotely archive blowout preventer data, the method comprising:

connecting a first system controller, a second system controller, a first remote server, and a second remote server to a communications network;

receiving the blowout preventer data in the first and second system controllers;

archiving the blowout preventer data from the first system controller to the first remote server; and archiving the blowout preventer data from the first system controller to the second remote server upon a failure of the first remote server resulting from damage to an oilfield component.

22. The method of claim 21, further comprising archiving the blowout preventer data from the second system controller to the first remote server upon a failure of the first system controller from damage to the oilfield component.

23. The method of claim 21, further comprising archiving the blowout preventer data from the second system controller to the second remote server upon a failure of the first remote server and the first system controller from damage to the oilfield component.

24. The method of claim 21, further comprising connecting the first and second system controllers and the first and second remote servers to a redundant network.

25. The method of claim 24, further comprising archiving the blowout preventer data from at least one of the first and the second system controllers to at least one of the first and the second remote servers through the redundant network upon a failure of the communications network from damage to an oilfield component.

* * * * *